(12) United States Patent
Hisasue

(10) Patent No.: US 6,774,891 B2
(45) Date of Patent: Aug. 10, 2004

(54) TRANSCRIPTION SYSTEM

(75) Inventor: Koji Hisasue, Fukuoka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 285 days.

(21) Appl. No.: 10/115,054

(22) Filed: Apr. 3, 2002

(65) Prior Publication Data
US 2002/0175902 A1 Nov. 28, 2002

(30) Foreign Application Priority Data
Apr. 6, 2001 (JP) .......................... 2001-108173

(51) Int. Cl.⁷ .................................................. G09G 5/08
(52) U.S. Cl. ................. 345/175; 345/177; 345/179; 250/200
(58) Field of Search .................. 345/179, 158, 345/177, 173, 175, 178; 250/200

(56) References Cited

U.S. PATENT DOCUMENTS

| 4,688,933 A | * | 8/1987 | Lapeyre ..................... 356/3.16 |
| 6,100,877 A | | 8/2000 | Chery et al. |
| 6,104,387 A | | 8/2000 | Chery et al. |
| 6,111,565 A | | 8/2000 | Chery et al. |
| 6,124,847 A | | 9/2000 | Chery et al. |
| 6,147,681 A | | 11/2000 | Chery et al. |
| 6,335,723 B1 | * | 1/2002 | Wood et al. ................. 345/173 |

FOREIGN PATENT DOCUMENTS

| GB | 2 337 330 | 11/1999 |
| GB | 2 340 449 | 2/2000 |
| GB | 2 340 606 | 2/2000 |
| GB | 2 340 632 | 2/2000 |
| GB | 2 340 712 | 2/2000 |

* cited by examiner

Primary Examiner—Richard Hjerpe
Assistant Examiner—Robin Mak
(74) Attorney, Agent, or Firm—RatnerPrestia

(57) ABSTRACT

A transcription system, for determining a position of a stylus relative to a writing surface by receiving supersonic wave transmitted from the stylus when the stylus is positioned adjacent the writing surface, has a pair of supersonic wave detectors provided on a whiteboard. The supersonic wave detector has a detector cover for covering at least a front portion of a supersonic wave receiver of the supersonic wave detector with reference to the supersonic wave transmitted from the stylus. The detector cover has a hole, which is defined right in front of the receiver, having a diameter smaller than a diameter of the receiver. The detector cover further has a conical reflection board provided adjacent the hole of the detector cover.

19 Claims, 6 Drawing Sheets

TRANSCRIPTION SYSTEM

CROSS REFERENCE TO RELATED APPLICATION

This application is based upon and claims the benefit of priority of Japanese Patent Application No. 2001-108173 filed on Apr. 6, 2001, the contents of which are incorporated herein by reference.

BACKGROUND OF THE INVENTION

1. Field of the Invention

The present invention relates to a system and its kit for recording writing performed on a writing surface, and more particularly to a system and its kit wherein sound waves generated on the writing surface are detected using a sound waves detector.

2. Description of Related Art

Existing technologies for capturing and storing handwritten notes include digitized writing surfaces such as electronic whiteboards. These electronic whiteboards employ a stylus for generating infrared light and supersonic wave. A pair of detectors, provided on both sides of a writing surface, detects the infrared light and supersonic wave to send a position signal transmitted from the stylus on the writing surface to a personal computer.

If the detectors detect not only supersonic wave directly transmitted from the stylus but also the one reflected on the writing surface after transmitted from the stylus, stable signal transmission may be prevented because the reflected supersonic wave may interfere with the directly transmitted supersonic wave. Such interference may cause a decrease in amplitude of supersonic wave to be detected and may result in incorrect detection.

SUMMARY OF THE INVENTION

Accordingly, it is an object of the present invention to provide a transcription system and its kit capable of achieving stable signal transmission.

According to a first aspect of the present invention, a transcription system, for determining a position of a stylus relative to a writing surface by receiving supersonic wave transmitted from the stylus when the stylus is positioned adjacent the writing surface, has a pair of supersonic wave detectors provided on a whiteboard. The supersonic wave detector has a detector cover for covering at least a front portion of a supersonic wave receiver of the supersonic wave detector with reference to the supersonic wave transmitted from the stylus. The detector cover has a hole, which is defined right in front of the receiver, having a diameter smaller than a diameter of the receiver. The detector cover further has a conical reflection board provided adjacent the hole of the detector cover.

According to another aspect of the present invention, the holes of the detector covers are aligned with the writing surface instead of providing the conical reflection board.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS (First Embodiment)

Figure 1:
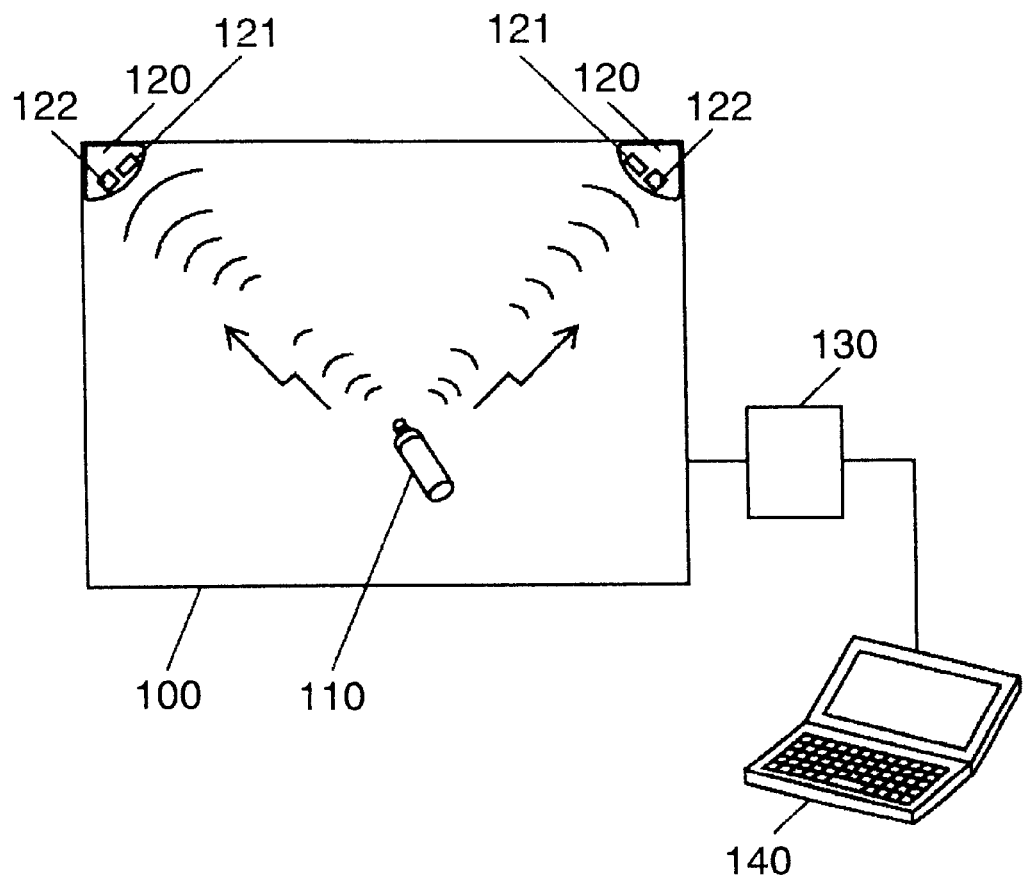
FIG. 1 is a schematic illustration of a transcription system according to a first embodiment of the present invention.

FIG. 1 illustrates a first embodiment of a transcription system according to the present invention. As illustrated, the system includes an electronic stylus 110 which transmits infrared light and supersonic wave to a pair of sensor portions 120 provided on top corners of a whiteboard 100. Each of the sensor portion 120 has an infrared light detector 121 and a supersonic wave detector 122 to output detection signals to a controller 130.

The controller 130 determines respective distances from the electronic stylus 110 to the sensor portions 120 according to detection time differences between the infrared light and supersonic wave, and transfers distance data to a personal computer 140. The personal computer 140 processes distance data using trigonometry to determine the location of the electronic stylus 110 on the whiteboard 100, and then shows location information of the electronic stylus 110 on a display of the personal computer 140.

Figure 2:
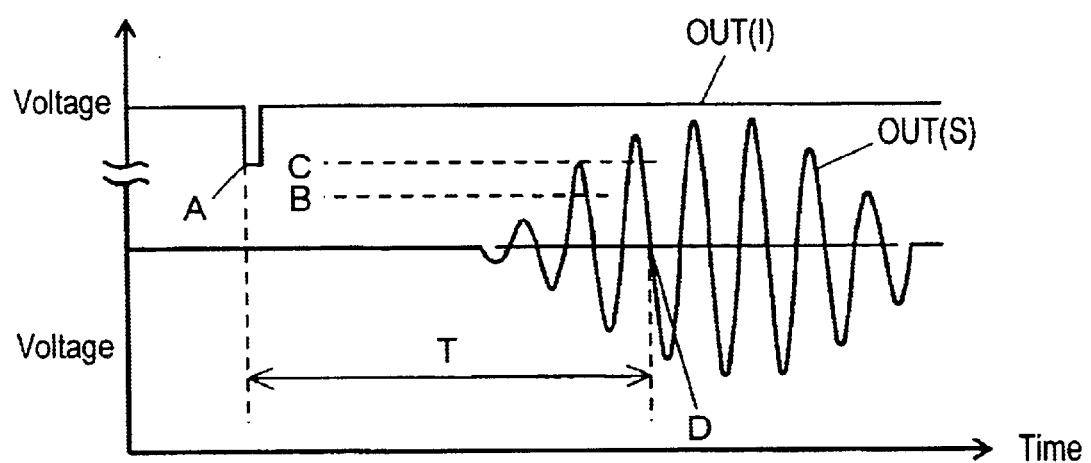
FIG. 2 is a schematic diagram showing output signals of an infrared light detector and a supersonic wave detector according to the first embodiment of the present invention.
Figure 3:
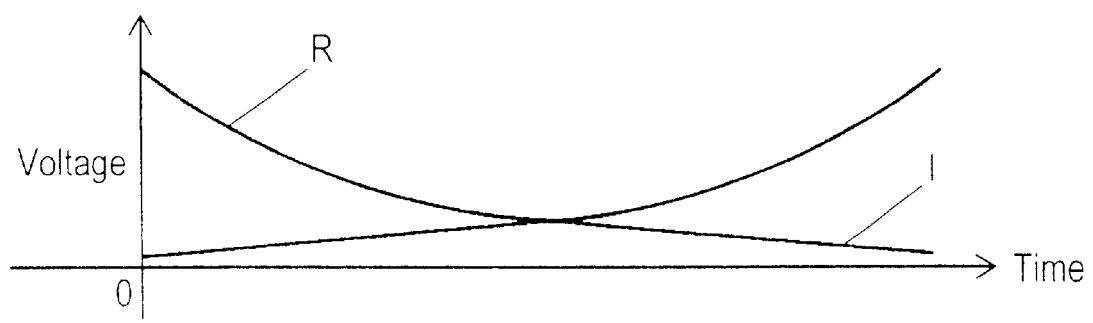
FIG. 3 is a schematic diagram showing a correction for damping of supersonic wave according to the first embodiment of the present invention.

Referring to FIGS. 2 and 3, processes carried out by the controller 130 will now be described. In FIG. 2, OUT(I) represents an output signal of the infrared light detector 121 and OUT(S) represents an output signal of the supersonic wave detector 122. A point 'A' on the OUT(I) shows a timing when the infrared light detector 121 receives infrared light transmitted from the electronic stylus 110.

FIG. 3 shows a correction for damping of supersonic wave according to the first embodiment of the present invention. Supersonic wave is generally damped as its transmission distance (time) increases as shown by damping amount R in FIG. 3. Therefore, the controller 130 makes the correction for the OUT(S) by taking the damping of supersonic wave into consideration. The OUT(S) is corrected by amplified amount I in FIG. 3 to cancel the damping.

The controller 130 also recognizes signal waves of the corrected output signal OUT(S) which are greater than a predetermined value B shown in FIG. 2, and then, it determines an arrival time T from the point A to point D if a next signal wave which is greater than a predetermined value C greater than the value B is recognized as shown in FIG. 2. Accordingly, distance is determined by the arrival time T and the speed of sound. In the first embodiment of the present invention, the controller 130 determines distance at the end of the third wave (point D) when the second wave is greater than the value B and the third wave is greater than the value C. The values B and C are, but not limited to, 2.5 Volts and 3.5 Volts respectively.

Figure 4:
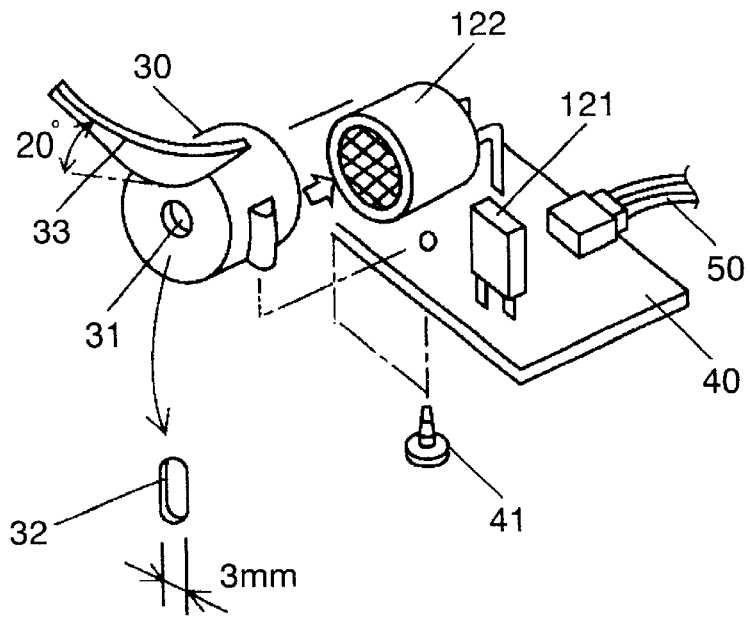
FIG. 4 is a perspective illustration of a sensor portion according to the first embodiment of the present invention.

Referring to FIG. 4, more details of the sensor portion 120 will now be described. The infrared light detector 121 and the supersonic wave detector 122 are mounted on an electronic circuit board 40. The infrared light detector 121 detects infrared light transmitted from the electronic stylus 110 and converts it into electrical signals to transmit it to the controller 130 via a cable 50.

The supersonic wave detector 122 detects supersonic wave transmitted from the electronic stylus 110 and converts it into electrical signals to transmit it to the controller 130 via a cable 50.

The controller 130 determines distance from the electronic stylus 110 to the supersonic wave detectors 122 according to the arrival time T, that is the time until the supersonic wave detector 122 detects supersonic wave after the infrared light detector 121 detects infrared light. A position coordinate of the electronic stylus 110 on the whiteboard 100 is determined by distance obtained from the sensor portions 120 by using the triangulation or trigonometry.

A detector cover 30 is provided in front of the supersonic wave detector 122. The detector cover 30 is fixed to the electronic circuit board 40 by a screw 41. Supersonic wave transmitted from the electronic stylus 110 goes through a hole 31 of the detector cover 30 to be detected by the supersonic wave detector 122. The hole 31 has a circular shape having a diameter of 3 millimeters. Accordingly, it is capable of obtaining stable outputs having wide directivity characteristics from the supersonic wave detector 122 by providing the hole 31.

Alternatively, a longitudinal hole 32 having a width of 3 millimeters may be employed instead of the hole 31. In that case, wide directivity characteristics on a horizontal surface of the whiteboard 100 and strong directivity characteristics in a vertical direction with reference to the surface of the whiteboard 100 can be obtained. Accordingly, stable detection of the necessary supersonic wave to be detected on the whiteboard 100 can be achieved.

The detector cover 30 has a conical reflection board 33 which reflects a part of supersonic wave transmitted from the electronic stylus 110. The supersonic wave detector 122 generally detects both of supersonic wave directly transmitted from the electronic stylus 110 and the one once reflected on the surface of the whiteboard 100. Occasionally, such direct transmission and the reflected transmission of the wave cancel each other when one of the directly transmitted wave and the reflected wave is delayed by half wavelength from the other.

The reflection board 33 has a inclination of about 200 and a length of 25 millimeters for generating cancellation wave which cancels the reflected wave. Accordingly, stable outputs are obtained for any location of the electronic stylus 110. Since the reflection board 33 has the inclined conical surface as shown in FIG. 4, the cancellation wave can be obtained in all directions on the whiteboard 100.

Figure 5:
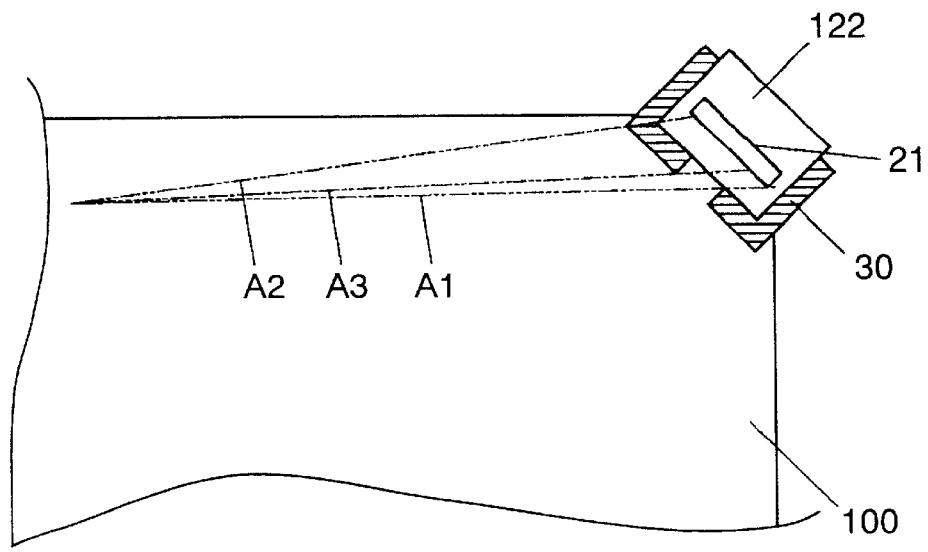
FIG. 5 is a schematic cross sectional illustration showing the operational principle of the supersonic wave detector according to the first embodiment of the present invention.
Figure 6:
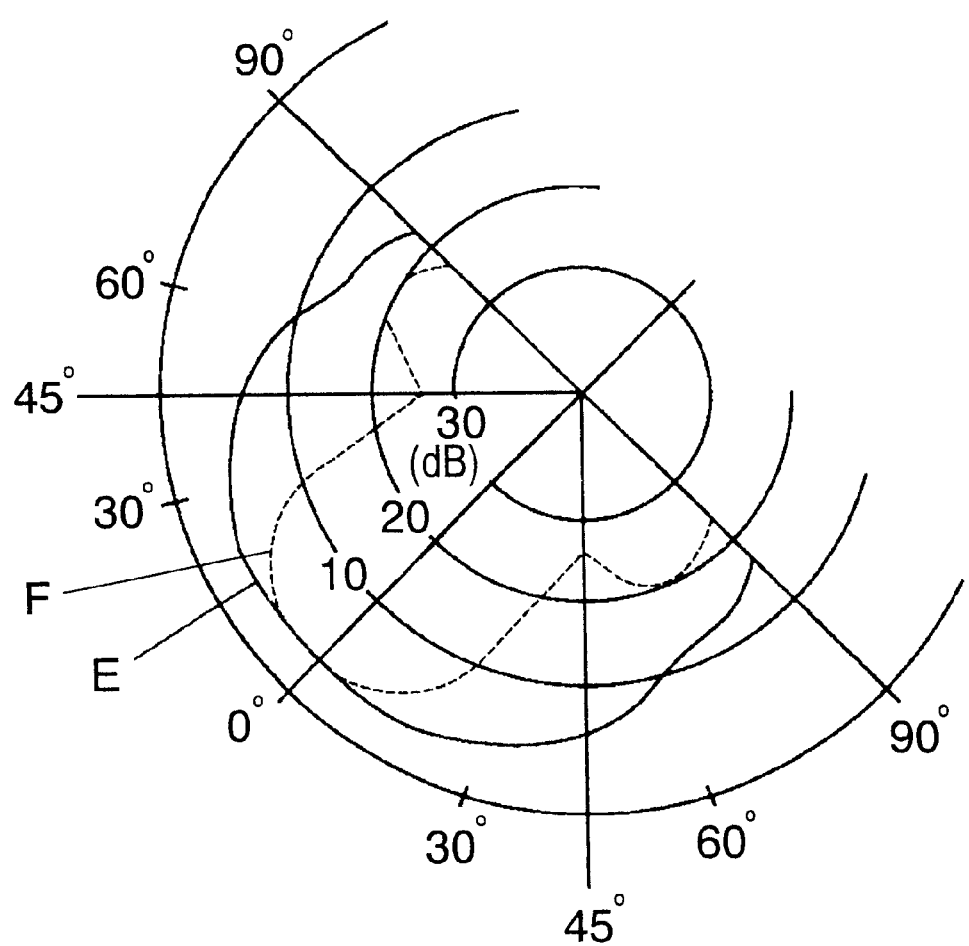
FIG. 6 is a directivity diagram showing directivity characteristics of the supersonic wave detector according to the first embodiment of the present invention.

Mechanism of the wave cancellation by the reflection board 33 will now be described in detail referring to FIGS. 5–8. FIG. 5 is a schematic cross sectional illustration of the supersonic wave detector 122 viewed from the top.

Assuming supersonic waves A1, A2 and A3 transmitted from the electronic stylus 110 on the whiteboard 100 exist as shown in FIG. 5. The supersonic wave detector 122 has a receiver 21. If the detector cover 30 does not exist, a phase difference between supersonic waves A1 and A2 may cause the cancellation of these waves A1 and A2 when the phase difference is integral times as large as the half wavelength of the supersonic wave. In that case, the directivity of the supersonic wave detector 122 becomes intense as shown by "F" in FIG. 6. A supersonic wave detector generally has an intensive directivity as shown by "F" in FIG. 6. Accordingly, sensitivity for supersonic wave comes from front of the supersonic wave detector is greater than the one for supersonic wave comes from both sides of the supersonic wave detector. This sensitivity difference may prevent a stable detection of supersonic wave since the sensitivity changes depending on the location of the electronic stylus 110. Therefore, the supersonic wave detector is required to have a wide directivity to obtain the same output signals for supersonic waves transmitted from the electronic stylus 110 on any place on the white board 100.

According to the first embodiment of the present invention, however, the hole 31 or 32 formed on the detector cover 30 leads supersonic wave to the receiver 21 within the range between A1 and A3. Accordingly, the directivity of the supersonic wave detector 122 is widened as shown by "E" in FIG. 6.

Furthermore, the conical reflection board 33 is provided adjacent to the supersonic wave detector 122 to cancel the reflected supersonic wave reflected by the whiteboard 100. Accordingly, the influence of the reflected supersonic wave reflected by the whiteboard 100 is reduced.

Figure 7:
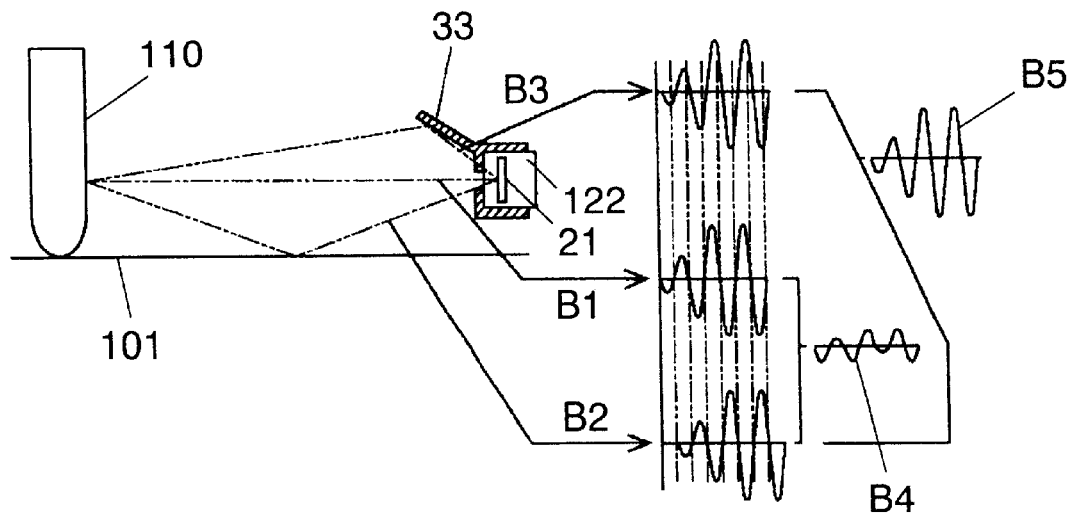
FIG. 7 is an illustration showing the operational principle of the supersonic wave detector according to the first embodiment of the present invention.

Referring to FIG. 7, B1 represents supersonic wave directly transmitted to the receiver 21 and B2 represents supersonic wave reflected on the surface 101 of the whiteboard 100 and received by the receiver 21. Assuming supersonic waves B1, B2 and B3 transmitted from the electronic stylus 110 on a surface 101 of the whiteboard 100 exist as shown in FIG. 7, B1 and B2 interfere and cancel each other when the phase difference between B1 and B2 is integral times as large as the half wavelength of the supersonic wave. In that case, the amplitude of the supersonic wave B1 is reduced as shown by B4. When the amplitude of OUT(S) of the supersonic detector 122 is too small or too large, the arrival time T is incorrectly determined since next wave or prior wave may be recognized for determining the arrival time T.

According to the first embodiment of the present invention, however, supersonic wave B3 reflected by the reflection board 33 is also received by the receiver 21 in addition to B1 and B2. Supersonic wave B3 has very little phase difference with supersonic wave B1 because supersonic wave B3 reflects at the reflection board 33 provided very close to the receiver 21 and the distance between supersonic wave B3 and supersonic wave B1 is very small. Accordingly, supersonic wave B3 makes up the amplitude reduction caused by supersonic wave B2 as shown by B5.

Since the reflection board 33 has the conical shape, supersonic wave B3 for compensating for the amplitude reduction can be collected in all directions on the writing surface 101 of the whiteboard 100. Thus, uniform and stable supersonic wave is received by the supersonic wave detector 122 in a wide range of the surface 101 of the whiteboard 100. Accordingly, drawing information is correctly sent to the personal computer 140.

(Second Embodiment)

Figure 8:
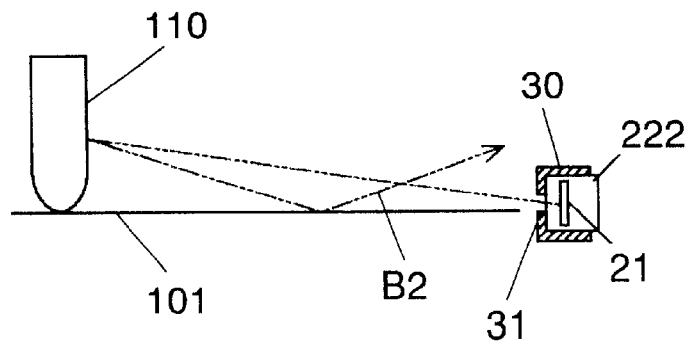
FIG. 8 is an illustration showing a second embodiment of the present invention.

Referring to FIG. 8, a second embodiment of the present invention will now be described. In the second embodiment, components which are substantially the same as those in the first embodiment are assigned the same reference numerals.

According to the second embodiment, a supersonic wave detector 222 does not have the reflection board 33 employed in the first embodiment. Instead of employing the reflection board 33, the hole 31 of the detector cover 30 of the supersonic wave detector 222 is aligned with the writing surface 101 of the whiteboard 100 so that the supersonic wave detector 222 does not detect supersonic wave B2 reflected on the surface 101 of the whiteboard 100. In other words, the holes 31 of the detector covers 30 of the supersonic wave detectors 222 are located on the same plane of the writing surface 101 as shown in FIG. 8. Accordingly, the detection by the supersonic wave detector 222 of the supersonic wave reflected on the writing surface 101 is prevented.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defines in the appended claims.

What is claimed is:

1. A transcription system for determining a position of a stylus relative to a writing surface by receiving infrared light and supersonic wave transmitted from said stylus through the air when said stylus is positioned adjacent said writing surface, said system comprising:

a whiteboard having said writing surface;

a pair of infrared light detectors provided on said whiteboard for detecting infrared light transmitted from said stylus and for converting said detected infrared light into an electric signal;

a pair of supersonic wave detectors provided on said whiteboard for detecting supersonic wave transmitted from said stylus and for converting said detected supersonic wave into an electric signal, each of said supersonic wave detectors having a supersonic wave receiver for receiving said supersonic wave transmitted from said stylus;

a detector cover for covering at least a front portion of said supersonic wave receiver with reference to said supersonic wave transmitted from said stylus, said detector cover having a portion defining a hole having a diameter smaller than a diameter of said receiver, said hole being defined in front of said receiver;

a conical reflection board provided adjacent said portion of said detector cover; and a processor for determining said position of said stylus based on time difference between times of flight of said infrared light and said supersonic wave by processing said electric signals of said supersonic wave detectors and said infrared light detectors.

2. The transcription system as in claim 1, wherein said conical reflection board is provided at 20° angle to said writing surface of said whiteboard.

3. The transcription system as in claim 2, wherein said conical reflection board has a length of 25 millimeters.

4. The transcription system as in claim 2, wherein said diameter of said hole is 3 millimeters.

5. The transcription system as in claim 1, wherein said portion defines an oval hole which is greater than 3 millimeters in length and 3 millimeters in width.

6. The transcription system as in claim 1, wherein said processor includes a function for sending image data, corresponding to a drawing made by said stylus on said whiteboard, to a monitor operatively connected to said transcription system.

7. The transcription system as in claim 6, wherein said processor further includes a function selected from a group consisting of modifying, saving, and erasing an image displayed on said monitor.

8. The transcription system as in claim 1, wherein said electric signal of said supersonic wave detectors is compensated by a time difference between a detection of said infrared light and a detection of said supersonic wave.

9. A transcription system for determining a position of a stylus relative to a writing surface by receiving supersonic wave transmitted from said stylus through the air when said stylus is positioned adjacent said writing surface, said system comprising:

a whiteboard having said writing surface;

a pair of supersonic wave detectors provided on said whiteboard for detecting supersonic wave transmitted from said stylus and for converting said detected supersonic wave into an electric signal, each of said supersonic wave detectors having a supersonic wave receiver for receiving said supersonic wave transmitted from said stylus;

a detector cover for covering at least a front portion of said supersonic wave receiver with reference to said supersonic wave transmitted from said stylus, said detector cover having a portion defining a hole having a diameter smaller than a diameter of said receiver, said hole being defined in front of said receiver; and a conical reflection board provided adjacent said portion of said detector cover.

10. The transcription system as in claim 9, wherein said conical reflection board is provided at 20° angle to said writing surface of said whiteboard.

11. The transcription system as in claim 10, wherein said conical reflection board has a length of 25 millimeters.

12. The transcription system as in claim 10, wherein said diameter of said hole is 3 millimeters.

13. The transcription system as in claim 9, wherein said portion defines an oval hole which is greater than 3 millimeters in length and 3 millimeters in width.

14. A transcription system for determining a position of a stylus relative to a writing surface by receiving infrared light and supersonic wave transmitted from said stylus through the air when said stylus is positioned adjacent said writing surface, said system comprising:

a whiteboard having said writing surface;

a pair of infrared light detectors provided on said whiteboard for detecting infrared light transmitted from said stylus and for converting said detected infrared light into an electric signal;

a pair of supersonic wave detectors provided on said whiteboard for detecting supersonic wave transmitted from said stylus and for converting said detected supersonic wave into an electric signal, each of said supersonic wave detectors having a supersonic wave receiver for receiving said supersonic wave transmitted from said stylus;

a detector cover for covering at least a front portion of said supersonic wave receiver with reference to said supersonic wave transmitted from said stylus, said detector cover having a portion defining a hole having a diameter smaller than a diameter of said receiver, said hole being aligned with said writing surface and being defined in front of said receiver; and a processor for determining said position of said stylus based on time difference between times of flight of said infrared light and said supersonic wave by processing said electric signals of said supersonic wave detectors and said infrared light detectors.

15. The transcription system as in claim 14, wherein said diameter of said hole is 3 millimeters.

16. The transcription system as in claim 14, wherein said portion defines an oval hole which is greater than 3 millimeters in length and 3 millimeters in width.

17. The transcription system as in claim 14, wherein said processor includes a function for sending image data, corresponding to a drawing made by said stylus on said whiteboard, to a monitor operatively connected to said transcription system.

18. The transcription system as in claim 17, wherein said processor further includes a function selected from a group consisting of modifying, saving, and erasing an image displayed on said monitor.

19. The transcription system as in claim 14, wherein said electric signal of said supersonic wave detectors is compensated by a time difference between a detection of said infrared light and a detection of said supersonic wave.

* * * * *